United States Patent
Herron et al.

(10) Patent No.: US 8,279,620 B2
(45) Date of Patent: Oct. 2, 2012

(54) LOW INDUCTANCE POWER ELECTRONICS ASSEMBLY

(75) Inventors: Nicholas Hayden Herron, Redondo Beach, CA (US); Brooks S. Mann, Redondo Beach, CA (US); Mark D. Korich, Chino Hills, CA (US); Cindy Chou, Lakewood, CA (US); David Tang, Fontana, CA (US); Douglas S. Carlson, Hawthorne, CA (US); Alan L. Barry, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 298 days.

(21) Appl. No.: 12/632,067

(22) Filed: Dec. 7, 2009

(65) Prior Publication Data

US 2011/0069466 A1    Mar. 24, 2011

Related U.S. Application Data

(60) Provisional application No. 61/244,331, filed on Sep. 21, 2009.

(51) Int. Cl.
*H05K 1/11* (2006.01)

(52) U.S. Cl. .................................... 361/803; 361/784

(58) Field of Classification Search ............... 361/803, 361/818, 800, 816, 752, 709, 797, 784; 174/51, 174/255
See application file for complete search history.

(56) References Cited

U.S. PATENT DOCUMENTS

| 6,493,249 B2* | 12/2002 | Shirakawa et al. | 363/147 |
| 2008/0117602 A1* | 5/2008 | Korich et al. | 361/715 |
| 2011/0146042 A1* | 6/2011 | Kelly et al. | 29/25.41 |

* cited by examiner

*Primary Examiner* — Yuriy Semenenko
(74) *Attorney, Agent, or Firm* — Ingrassia Fisher & Lorenz P.C.

(57) ABSTRACT

A power electronics assembly is provided. A first support member includes a first plurality of conductors. A first plurality of power switching devices are coupled to the first support member. A first capacitor is coupled to the first support member. A second support member includes a second plurality of conductors. A second plurality of power switching devices are coupled to the second support member. A second capacitor is coupled to the second support member. The first and second pluralities of conductors, the first and second pluralities of power switching devices, and the first and second capacitors are electrically connected such that the first plurality of power switching devices is connected in parallel with the first capacitor and the second capacitor and the second plurality of power switching devices is connected in parallel with the second capacitor and the first capacitor.

10 Claims, 7 Drawing Sheets

LOW INDUCTANCE POWER ELECTRONICS ASSEMBLY

CROSS REFERENCE TO RELATED APPLICATIONS

This application claims the benefit of U.S. Provisional Application No. 61/244,331, filed Sep. 21, 2009.

STATEMENT REGARDING FEDERALLY SPONSORED RESEARCH OR DEVELOPMENT

This invention was made with Government support under DE-FC26-07NT43123, awarded by the U.S. Department of Energy. The Government has certain rights in this invention.

TECHNICAL FIELD

The present invention generally relates to power electronics, and more particularly relates to a low inductance power electronics assembly for automotive electrical systems.

BACKGROUND OF THE INVENTION

In recent years, advances in technology, as well as ever-evolving tastes in style, have led to substantial changes in the design of automobiles. One of the changes involves the complexity of the electrical systems within automobiles, particularly alternative fuel (or propulsion) vehicles that utilize voltage supplies, such as hybrid and battery electric vehicles. Such alternative fuel vehicles typically use one or more electric motors, often powered by batteries, perhaps in combination with another actuator, to drive the wheels.

Such vehicles often use two separate voltage sources, such as a battery and a fuel cell, to power the electric motors that drive the wheels. Power electronics (or power electronics systems), such as direct current-to-direct current (DC/DC) converters, are typically used to manage and transfer the power from the two voltage sources. Also, due to the fact that alternative fuel automobiles typically include only direct current (DC) power supplies, direct current-to-alternating current (DC/AC) inverters (or power inverters) are also provided to convert the DC power to alternating current (AC) power, which is generally required by the motors.

As the power demands on the electrical systems in alternative fuel vehicles continue to increase, there is an ever-increasing need to maximize the electrical efficiency of such systems. There is also a constant desire to reduce the size of the components within the electrical systems in order to minimize the overall cost and weight of the vehicles.

Accordingly, it is desirable to provide a power electronics assembly with reduced sized and weight, minimal parts, and improved performance. Furthermore, other desirable features and characteristics of the present invention will become apparent from the subsequent description taken in conjunction with the accompanying drawings and the foregoing technical field and background.

SUMMARY OF THE INVENTION

A power electronics assembly is provided. A first support member includes a first plurality of conductors. A first plurality of power switching devices are coupled to the first support member. A first capacitor is coupled to the first support member. A second support member includes a second plurality of conductors. A second plurality of power switching devices are coupled to the second support member. A second capacitor is coupled to the second support member. The first and second pluralities of conductors, the first and second pluralities of power switching devices, and the first and second capacitors are electrically connected such that the first plurality of power switching devices is connected in parallel with the first capacitor and the second capacitor and the second plurality of power switching devices is connected in parallel with the second capacitor and the first capacitor.

An automotive power electronics assembly is provided. A first support member includes first and second conductive layers formed therein. A first plurality of power modules, each comprising at least one power switching device, is coupled to the first support member. A first capacitor is coupled to the first support member. A second support member includes first and second conductive layers formed therein. A second plurality of power modules, each comprising at least one power switching device, is coupled to the second support member. A second capacitor is coupled to the second support member. The first and second conductive layers of the respective first and second support members, the at least one power switching devices of the respective first and second pluralities of power modules, and the first and second capacitors are electrically connected such that the at least one power switching device of each of the first plurality of power modules is connected in parallel with the first capacitor and the second capacitor and the at least one power switching device of each of the second plurality of power modules is connected in parallel with the second capacitor and the first capacitor.

An automotive propulsion system is provided. The system includes an electric motor, a direct current DC voltage source, a power electronics assembly, and a processing system. The DC voltage source is coupled to the electric motor. The power electronics assembly is coupled to the electric motor and the DC voltage source. The power electronics assembly includes a first support substrate having a first conductive member and a second conductive member, a first plurality of power switching devices coupled to the first support substrate, a first capacitor coupled to the first support substrate, a second support member having a first conductive member and a second conductive member, a second plurality of power switching devices coupled to the second support substrate, and a second capacitor coupled to the second support substrate. The first and second conductive members of the respective first and second support substrates, the first and second pluralities of power switching devices, and the first and second capacitors are electrically connected such that the first plurality of power switching devices is connected in parallel with the first capacitor and the second capacitor and the second plurality of power switching devices is connected in parallel with the second capacitor and the first capacitor. The processing system is coupled to the electric motor, the DC voltage source, and the power electronics assembly.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

Figure 1:
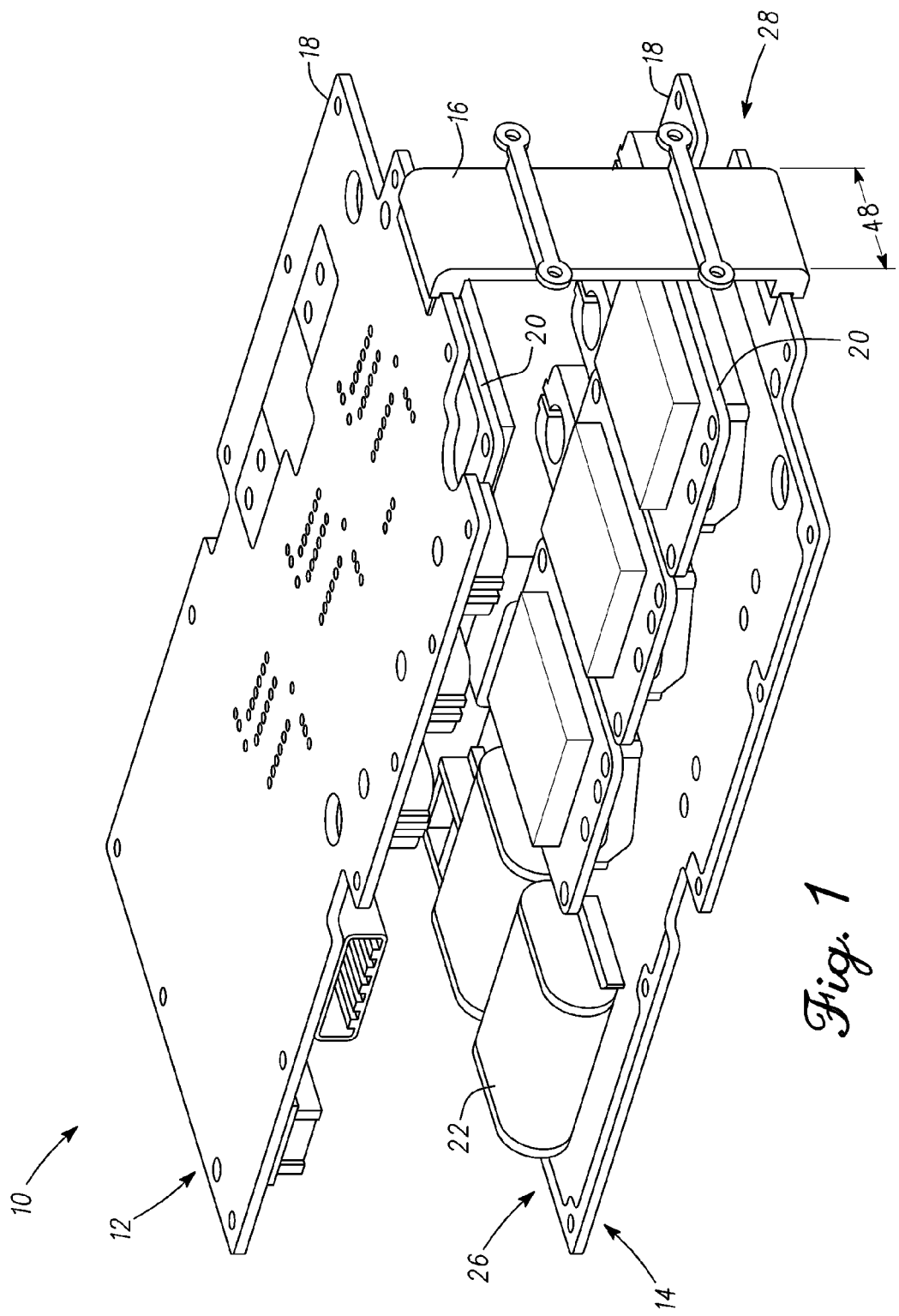
FIGS. 1 and 2 are isometric views of a power electronics assembly, according to one embodiment of the present invention.

The following detailed description is merely exemplary in nature and is not intended to limit the invention or the application and uses of the invention. Furthermore, there is no intention to be bound by any expressed or implied theory presented in the preceding technical field, background, and brief summary, or the following detailed description.

The following description refers to elements or features being "connected" or "coupled" together. As used herein, "connected" may refer to one element/feature being mechanically joined to (or directly communicating with) another element/feature, and not necessarily directly. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Further, various components and features described herein may be referred to using particular numerical descriptors, such as first, second, third, etc., as well as positional and/or angular descriptors, such as horizontal and vertical. However, such descriptors may be used solely for descriptive purposes relating to drawings and should not be construed as limiting, as the various components may be rearranged in other embodiments. It should also be understood that FIGS. 1-8 are merely illustrative and may not be drawn to scale.

FIG. 1 to FIG. 8 illustrate a power electronics assembly. A first support member includes a first plurality of conductors. A first plurality of power switching devices are coupled to the first support member. A first capacitor is coupled to the first support member. A second support member includes a second plurality of conductors. A second plurality of power switching devices are coupled to the second support member. A second capacitor is coupled to the second support member. The first and second pluralities of conductors, the first and second pluralities of power switching devices, and the first and second capacitors are electrically connected such that the first plurality of power switching devices is connected in parallel with the first capacitor and the second capacitor and the second plurality of power switching devices is connected in parallel with the second capacitor and the first capacitor.

Opposing sides of each of the switches may be electrically connected to an electric motor and a voltage source, respectively. The first and second capacitors may each include two electrodes. One of the electrodes may be electrically connected to a first terminal of the voltage source, and the other electrode may be electrically connected to a second terminal of the voltage source. The assembly may be used in a direct current-to-alternating current (DC/AC) inverter or a direct current-to-direct current (DC/DC) converter.

Figure 2:
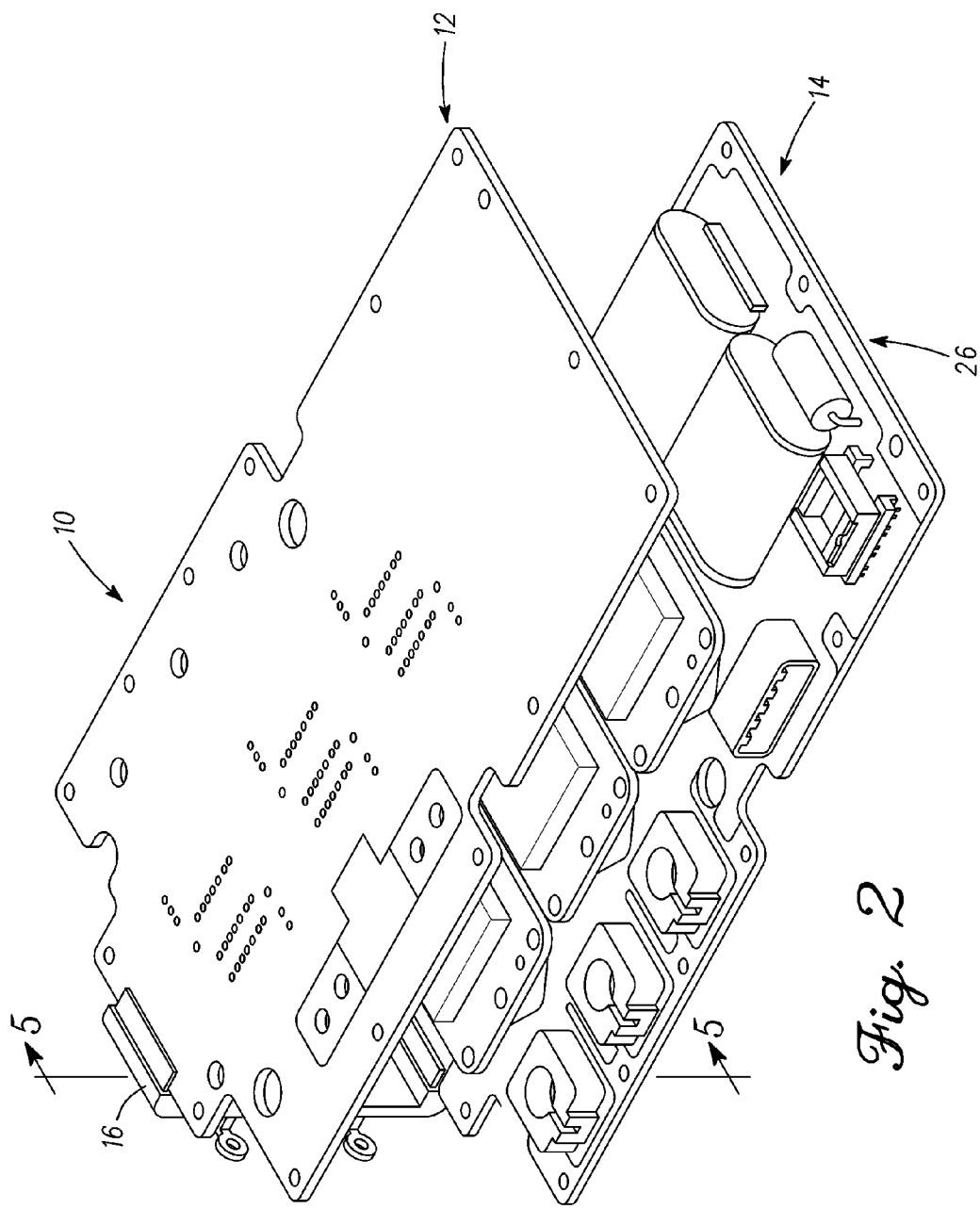
Figure 3:
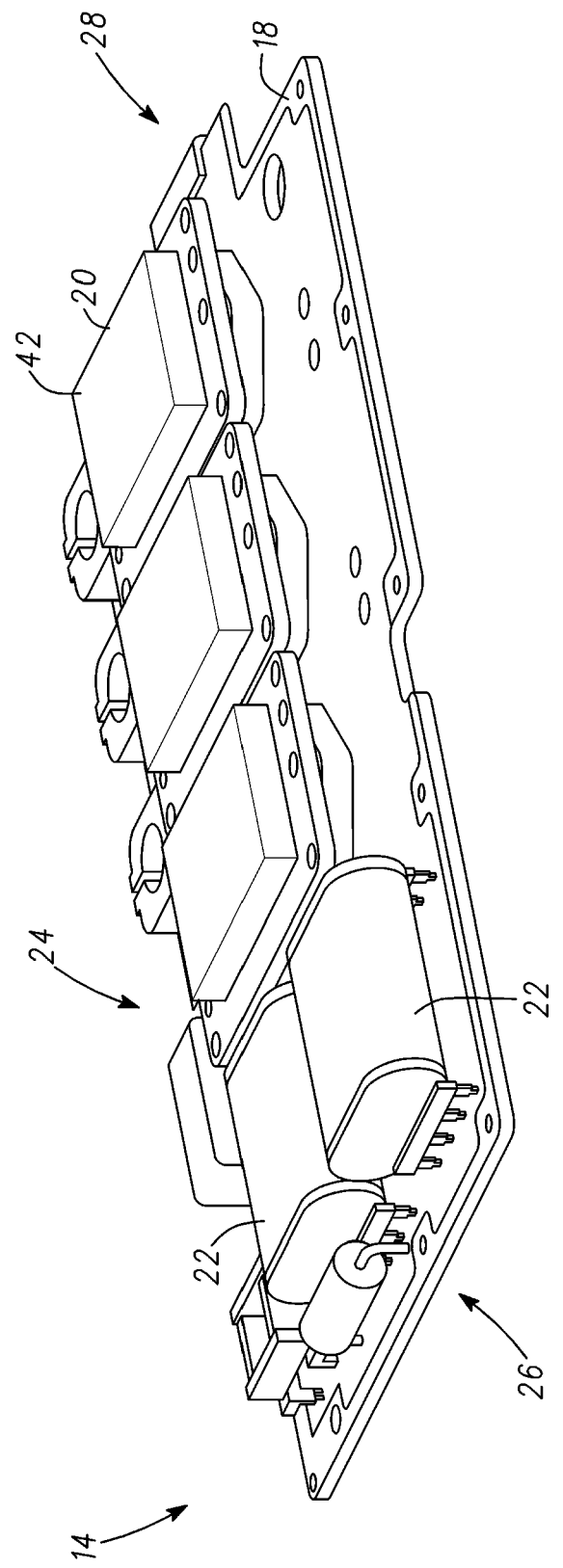
FIG. 3 is an isometric view of a module within the power electronics assembly of FIGS. 1 and 2.

FIGS. 1, 2, and 3 illustrate a power electronics assembly 10, according to one embodiment of the present invention. The assembly 10 includes first and second modules (or gate drive board assemblies) 12 and 14 and a power bridge 16 interconnecting the modules 12 and 14.

Although not explicitly shown, in one embodiment, the first and second modules 12 and 14 are substantially identical. As such, although the second module 14 is shown in FIG. 3, the following description may refer to either the first module 12 or the second module 14.

Still referring to FIGS. 1, 2, and 3, the second module 14 (and/or the first module 12) includes a substrate 18, power modules 20, capacitor bobbins 22, and various other electronic components 24.

Figure 4:
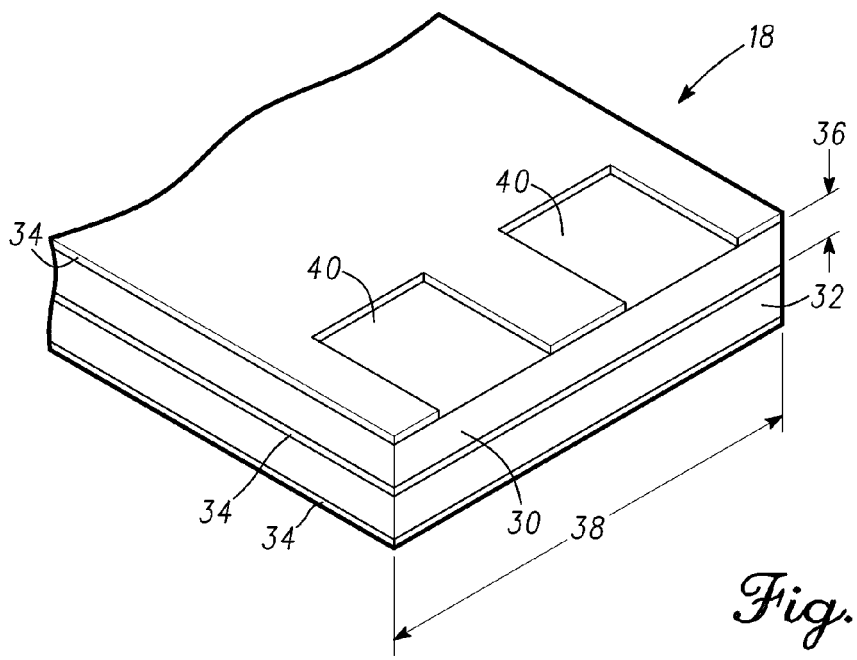
FIG. 4 is an isometric view of a substrate within the module of FIG. 3.

The substrate 18, or support member, is substantially rectangular and has a first portion 26 and a second portion 28, corresponding to respective ends thereof. As shown in FIG. 4 (which is not drawn to scale), the substrate 18 includes a first conductive member 30, a second conductive member 32, and multiple insulating layers 34. In one embodiment, the first and second conductive members 30 and 32 are layers made of an electrically conductive material, such as copper or aluminum, and each has a thickness 36 of, for example, between 100 micrometers (μm) and 1 millimeter (mm). As shown, the first and second conductive members 30 and 32 share a width 38 (at least at some portions thereof) that extends across the entirety of the substrate 18 (i.e., substantially across the length and width of the substrate), including between the first and second portions 26 and 28 of the substrate 18.

As shown, in the depicted embodiment, there are three insulating layers 34, with one between the first and second conductive members 30 and 32 and the other two forming respective upper and lower surfaces of the substrate 18. Although not shown, the insulating layers 34 have a thickness of, for example, between 50 μm and 0.5 mm. The insulating layers may be a "pre-preg" composite material, as is commonly understood, or a ceramic material. In one embodiment, the substrate 18 is a heavy copper circuit board, as is commonly understood in the art. Portions of the insulating layers 34 may be removed to form exposed contact portions 40, which are shown in an exemplary fashion in FIG. 4, and may be used to connect, for example, the power modules 20 and the capacitor bobbins 22 to the conductive members 30 and 32.

Referring again to FIG. 3, the power modules 20 (e.g., three modules) are mounted to the substrate 18 on the second portion 28 and a central portion thereof. Although not specifically shown in FIG. 3, each of the power modules includes, for example, a pair of power switching devices, such as transistors formed on semiconductor (e.g., silicon) substrates. In one embodiment, the transistors are insulated gate bipolar transistors (IGBTs). The power switching devices within the power modules 20 are electrically connected to the other components on the module 14 through the first and/or the second conductive members 30 and 32 in the substrate 18 (e.g., via the exposed portions 40 and/or vias formed through the exposed portions 40). As shown, each of the power modules 20 includes a cooling structure 42 (e.g., a heat sink or a series of pins) extending from a surface thereof opposing the substrate 18.

The capacitor bobbins 22 (e.g., two) are mounted on the first portion 26 of the substrate 18. Although not specifically shown, each of the capacitor bobbins 22 includes two conductive sheets or ribbons (i.e., electrodes) and a dielectric material disposed between the conductive ribbons to form capacitors, as is commonly understood. The conductive ribbons are electrically connected to the other components on the module 14 through the first and/or the second conductive members 30 and 32 in the substrate 18 (e.g., via the exposed portions 40 and/or vias formed through the exposed portions 40).

The other electronic components 24 may include, for example, a transformer, current sensors, and gate driver circuitry. The other electronic components 24 may be electrically connected to the power modules 20 and the capacitor bobbins 22 through the first and/or the second conductive members 30 and 32 of the substrate 18 (e.g., via the exposed portions 40 and/or vias formed through the exposed portions 40).

Figure 5:
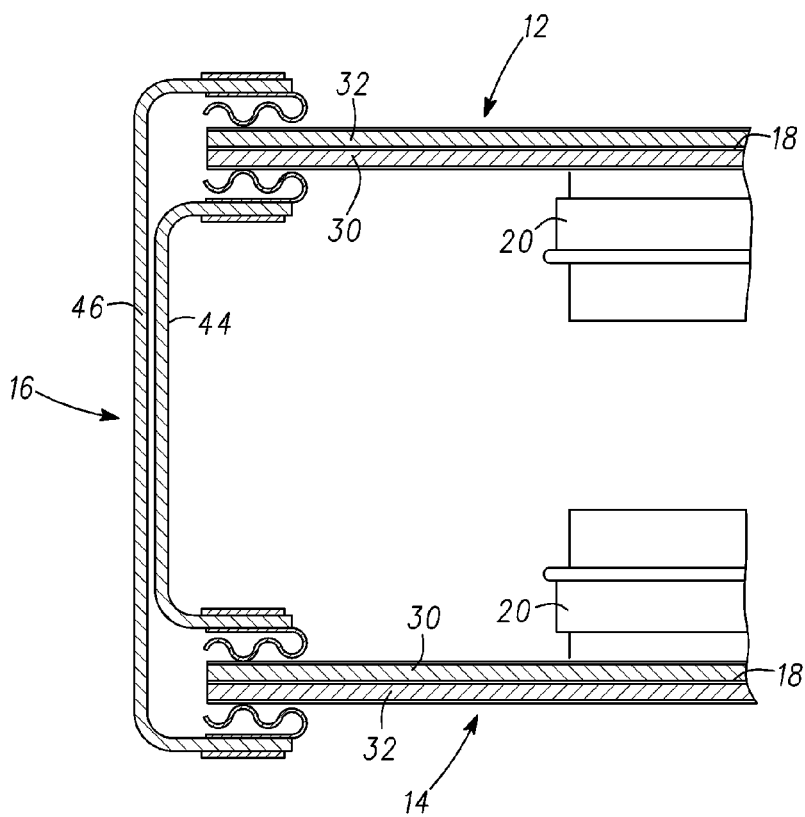
FIG. 5 is a side view of the power electronics assembly of FIGS. 1 and 2 taken along line 5-5 in FIG. 2.

Referring now to FIGS. 1, 2, and 5, the first and second modules 12 and 14 are arranged such that the respective sets of power modules 20, capacitor bobbins 22, and other electronic components 24 "face" each other (i.e., are positioned between the substrates 18). In other words, if each of the substrates 18 is considered to have first and second opposing sides the power modules 20, the capacitor bobbins 22, and other electronic components 24 are on the first side of the respective substrate 18, the substrates 18 are arranged such that the first sides of the substrates 18 are positioned between the second sides of the substrates 18.

The power bridge 16 interconnects the substrates 18 of the first and second modules 12 and 14 at the second portions (or ends) 28 thereof. In the depicted embodiment, the power bridge 16 includes first and second bridge conductors 44 and 46, which have a rectangular shape and share a width 48. That is, the first bridge conductor 44 has a first width, and the second bridge conductor 46 has a second width which is substantially the same as the first width. It should also be noted that the first and second bridge conductors 44 and 46 are aligned such that the second bridge conductor 46 "overlaps" the first bridge conductor 44, or vice versa.

The first bridge conductor 44 is electrically connected to the first conductive member 30 of the substrates 18 of both the first and second modules 12 and 14, and the second bridge conductor 46 is electrically connected to the second conductive member 32 of the substrate 18 of both the first and second modules 12 and 14. The first and second bridge conductors 44 and 46 may be made of copper and have a thickness (not shown), for example, of between 1 and 2 mm. Although not shown in FIGS. 1, 2, and 5, the first and second modules 12 and 14 may also be secured to, and held in place by, a frame (e.g., a body of an automobile).

Figure 6:
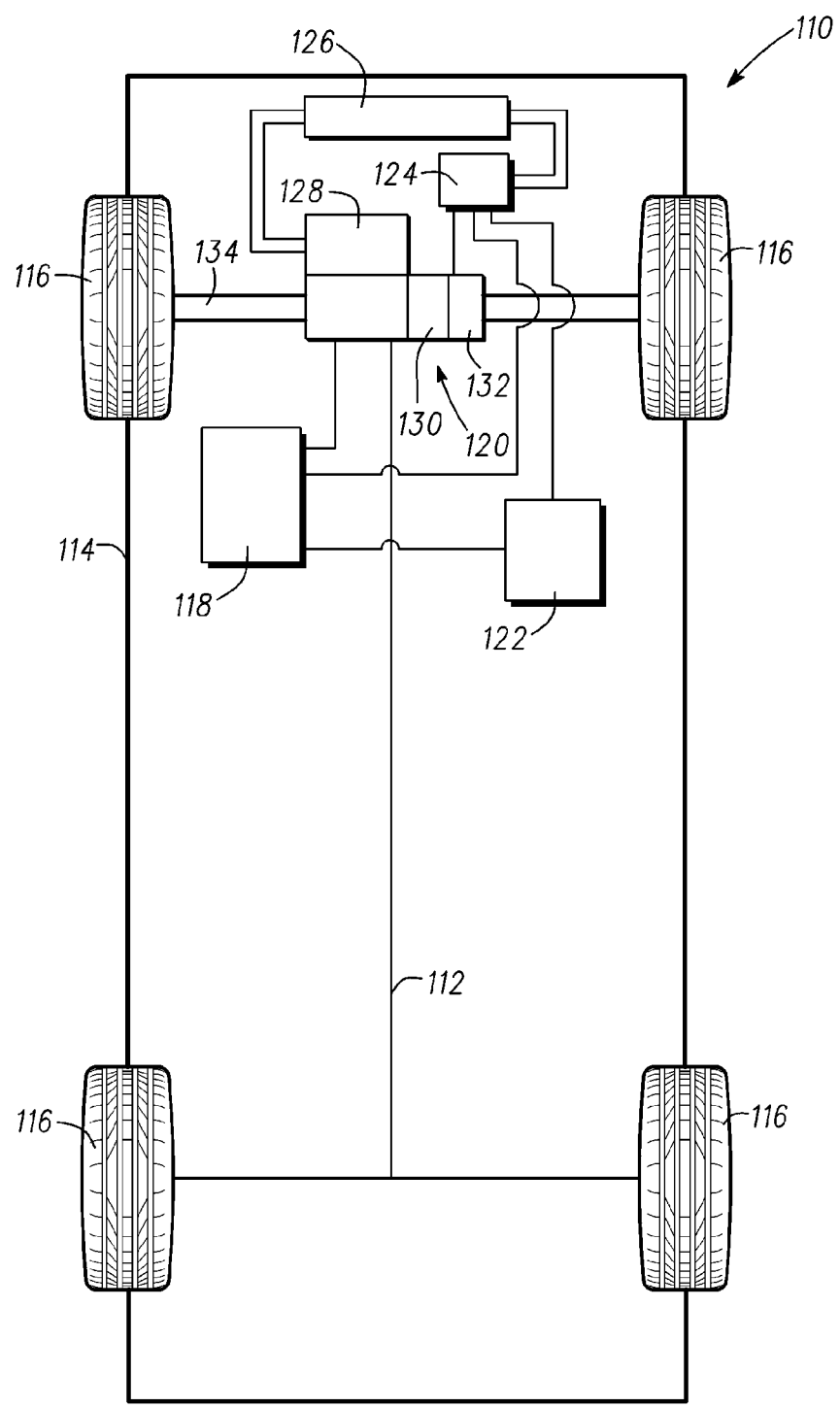
FIG. 6 is a schematic view of an exemplary automobile, according to one embodiment of the present invention.

FIG. 6 illustrates an exemplary vehicle (or "automobile") 110, in which the power electronics assembly described above may be implemented. The automobile 110 includes a chassis 112, a body 114, four wheels 116, and an electronic control system 118. The body 114 is arranged on the chassis 112 and substantially encloses the other components of the automobile 110. The body 114 and the chassis 112 may jointly form a frame. The wheels 116 are each rotationally coupled to the chassis 112 near a respective corner of the body 114.

The automobile 110 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 110 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine (i.e., such as in a hybrid electric vehicle (HEV)), and an electric motor.

In the exemplary embodiment illustrated in FIG. 6, the automobile 110 is an HEV, and further includes an actuator assembly 120, a battery (or a DC voltage source) 122, a power converter assembly (e.g., an inverter or inverter assembly) 124, and a radiator 126. The actuator assembly 120 includes a combustion engine 128 and, in one embodiment two electric motors/generators (or motors) 130 and 132.

Still referring to FIG. 6, the combustion engine 128 and/or the electric motors 130 and 132 are integrated such that one or both are mechanically coupled to at least some of the wheels 116 through one or more drive shafts 134. In one embodiment, the automobile 110 is a "series HEV," in which the combustion engine 128 is not directly coupled to the transmission, but coupled to a generator (not shown), which is used to power the electric motor 130. In another embodiment, the automobile 110 is a "parallel HEV," in which the combustion engine 128 is directly coupled to the transmission by, for example, having the rotors of the electric motors 130 and 132 rotationally coupled to the drive shaft of the combustion engine 128.

The radiator 126 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the engine 128 and the inverter 124.

Still referring to FIG. 6, in the depicted embodiment, the inverter 124 receives and shares coolant with the electric motor 130. However, other embodiments may use separate coolants for the inverter 124 and the electric motors 130 and 132. The radiator 126 may be similarly connected to the inverter 124 and/or the electric motors 130 and 132.

The electronic control system 118 is in operable communication with the actuator assembly 120, the high voltage battery 122, and the inverter 124. Although not shown in detail, the electronic control system 118 includes various sensors and automotive control modules, or electronic control units (ECUs), such as an inverter control module, a motor controller, and a vehicle controller, and at least one processor and/or a memory which includes instructions stored thereon (or in another computer-readable medium) for carrying out the processes and methods as described below.

Figure 7:
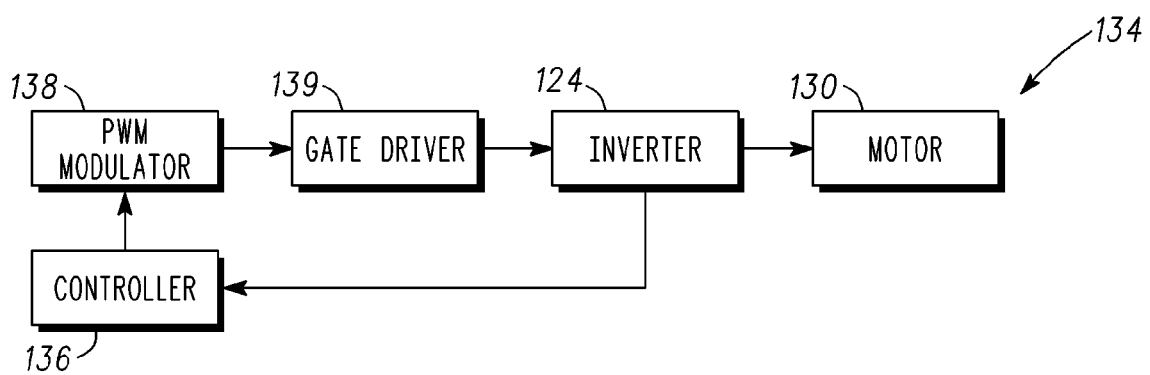
FIG. 7 is a block diagram of a voltage source inverter system within the automobile of FIG. 6.

FIG. 7 illustrates a voltage source inverter system (or electric drive system) 134, in accordance with an exemplary embodiment of the present invention. The voltage source inverter system 134 includes a controller 136 in operable communication with a Pulse Width Modulation (PWM) modulator 138 (or a pulse width modulator) and the inverter 124 (at an output thereof). The PWM modulator 138 is coupled to a gate driver 139, which in turn has an input coupled to an input of the inverter 124. The inverter 124 has a second output coupled to the motor 130 (and/or motor 132 which is not shown). The controller 136 and the PWM modulator 138 may be integral with the electronic control system 118 shown in FIG. 1.

Figure 8:
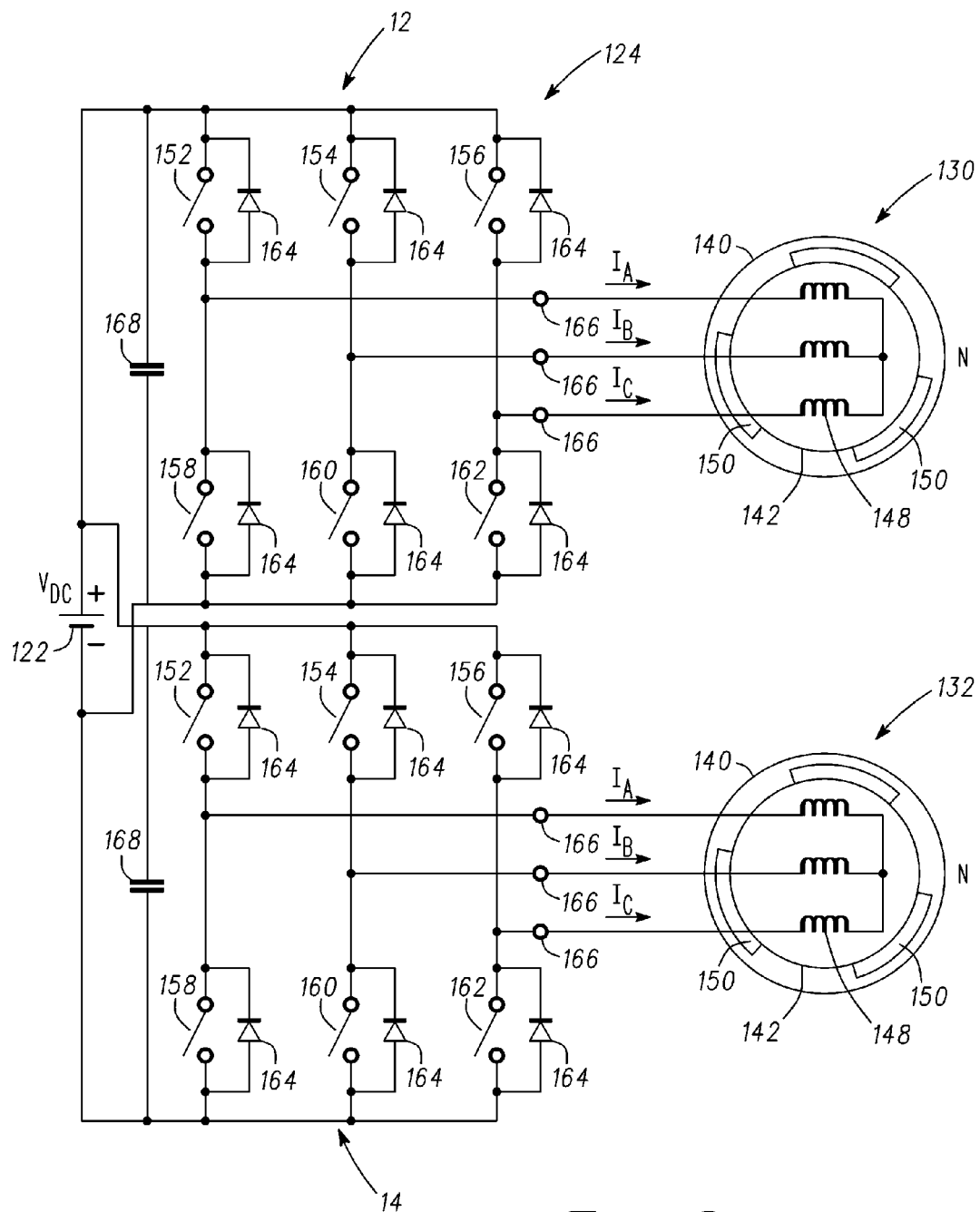
FIG. 8 is a schematic view of a battery, an inverter, and an electric motor within the automobile of FIG. 6.

FIG. 8 schematically illustrates the battery 122 (or other voltage source ($V_{dc}$)), the inverter 124, and the motors 130 and 132 of FIGS. 6 and 7 in greater detail. It should also be noted that FIG. 8 schematically illustrates the electrical interconnections between some of the components of the first and second modules 12 and 14 (FIG. 1). In one embodiment, the inverter 124 includes a two, three-phase circuits that are respectively formed by the first and second modules 12 and 14 of the power electronics assembly 10 (FIG. 1) described above. The first module 12 is coupled to motor 130, and the second module 14 is coupled to motor 132. More specifically, each of the modules 12 and 14 includes a switch network having a first input coupled to the battery 122 and an output coupled to a respective one of the motors 130 and 132. Although a single voltage source is shown, a distributed DC link with two series sources may be used.

As will be appreciated by one skilled in the art, the electric motors 130 and 132, in one embodiment, each include a stator assembly 140 (including conductive coils or windings) and a rotor assembly 142 (including a ferromagnetic core and/or magnets), as well as a transmission and a cooling fluid (not shown). Within each motor 130 and 132, the stator assembly 140 includes a plurality (e.g., three) conductive coils or windings 144, 146, and 148, each of which is associated with one of three phases of the electric motor 130, as is commonly understood. The rotor assembly 142 includes a plurality of magnets 150 and is rotatably coupled to the stator assembly 140, as is commonly understood. The magnets 150 may include multiple electromagnetic poles (e.g., sixteen poles), as is commonly understood. It should be understood that the description provided above is intended as example of one type of electric motor that may be used.

Each of the switch networks formed by the respective modules 12 and 14 comprises three pairs (a, b, and c) of series power switching devices (or switches) with antiparallel diodes (i.e., antiparallel to each switch) corresponding to each of the phases of the motor 130. Each of the pairs of series switches comprises a first switch, or transistor, (i.e., a "high" switch) 152, 154, and 156 having a first terminal coupled to a positive electrode of the battery 122 and a second switch (i.e., a "low" switch) 158, 160, and 162 having a second terminal coupled to a negative electrode of the battery 122 and a first terminal coupled to a second terminal of the respective first switch 152, 154, and 156.

Each of the switches 152-162 may be in the form of individual semiconductor devices formed within the power modules 20, as described above. As shown, a diode 164 is connected in an antiparallel configuration (i.e., "freewheeling diodes") to each of the switches 152-162 in both modules 12 and 14. As such, each of the switches 152-162 and the respective diode 64 may be understood to form a switch-diode pair or set, six of which are included in the embodiment shown.

Still referring to FIG. 8, the inverter 124 (and/or the motors 130 and 132) includes a plurality of current sensors 166, each of which is configured to detect the flow of current through a respective one of the windings 144, 146, and 148 of the motors 130 and 132 (and/or through the respective switches 152-162 or diodes 164).

The inverter 124 also includes capacitors 168 which are formed by the capacitor bobbins 22 described above. As shown, the modules 12 and 14 are electrically arranged such that the capacitor 168 of each module 12 and 14 is "shared" by the switches 152-162 of the other module (i.e., the capacitor 168 of each of the modules 12 and 14 is connected in parallel with the switches 152-162 of both modules 12 and 14). As is evident in FIG. 8, for each of the capacitors 168, one of the electrodes is electrically connected to the positive (+) terminal of the battery 122, and the other electrode is electrically connected to the negative (−) terminal of the battery 122.

In the particular embodiment shown, the "high" sides of the high switches 152, 154, and 156 in both modules 12 and 14 are electrically connected to the positive (+) terminal of the battery 122, and the "low" sides of the low switches 158, 160, and 12 of both modules 12 and 14 are electrically connected to the negative (−) terminal of the battery 122. As will be appreciated by one skilled in the art, the electrical connections shown in FIG. 8 may be at least partially formed using the first and second bridge conductors 44 and 46 of the power bridge 16 (FIG. 5).

During normal operation (i.e., driving), referring to FIGS. 6, 7, and 8, the automobile 110 is operated by providing power to the wheels 116 with the combustion engine 128 and the electric motor(s) 130 and 132 in an alternating manner and/or with the combustion engine 128 and the electric motor (s) 130 and 132 simultaneously. In order to power the electric motors 130 and 132, DC power is provided from the battery 122 (and, in the case of a fuel cell automobile, a fuel cell) to the inverter 124, which converts the DC power into AC power, before the power is sent to the electric motors 130 and 132. As will be appreciated by one skilled in the art, the conversion of DC power to AC power is substantially performed by operating (i.e., repeatedly switching) the switches 152-162 of both modules 12 and 14 at a "switching frequency," such as, for example, 12 kilohertz (kHz). Generally, the controller 136 produces a Pulse Width Modulation (PWM) signal for controlling the switching action of the inverter 124. The inverter 124 then converts the PWM signal to a modulated voltage waveform for operating the motors 130 and 132.

One advantage of the power electronics assembly described above is that the total bulk capacitance may be distributed for current sharing equally between the two modules, as soldered-on individual bobbins. This is possible because of the close proximity of the capacitor bobbins to the switching devices and the use of the low inductance bus created by the laminar current flow provided by the power bridge. Such an advantage would also be applicable to single multi-phase inverters. As a result, the housing and resin potting materials typically associated with bulk capacitors is not needed. It also eliminates the need for a bus structure to connect the capacitors to the modules, and any included fasteners, as the bus is provided by the heavy layers in the circuit card (i.e., the conductive members in the substrate). The structure of the heavy layer circuit card along with the laminar bridging bus structure, and the short distance from the bulk capacitor bobbins to the power modules, significantly reduces the overall inductance of the assembly. Using the gate drive card (i.e., the substrate) as a power stage allows each half of the inverter, or one of the modules (i.e., the gate drive circuitry, bulk capacitor, power modules, and current sensors) to be mounted and electrically connected using a single circuit card. As a result, the overall mass and volume occupied by the assembly is reduced. Additionally, the need for a separate housing and wiring harness for the current sensors, which is often found in power electronics assemblies, is reduced.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:
1. A power electronics assembly comprising:
 a first support member comprising a first plurality of conductors;
 a first plurality of power switching devices coupled to the first support member;

a first capacitor coupled to the first support member;
a second support member comprising a second plurality of conductors;
a second plurality of power switching devices coupled to the second support member;
a second capacitor coupled to the second support member,
wherein the first and second pluralities of conductors, the first and second pluralities of power switching devices, and the first and second capacitors are electrically connected such that the first plurality of power switching devices is connected in parallel with the first capacitor and the second capacitor and the second plurality of power switching devices is connected in parallel with the second capacitor and the first capacitor; and
a power bridge interconnecting the first support member and the second support member, wherein the power bridge comprises a first bridge conductor and a second bridge conductor,
wherein the first plurality of conductors and the second plurality of conductors each comprise a first conductive member and a second conductive member, and
wherein the first bridge conductor electrically interconnects the first conductive members of each of the first and second pluralities of conductors and the second bridge conductor electrically interconnects the second conductive members of each of the first and second pluralities of conductors.

2. The power electronics assembly of claim 1, wherein the first bridge conductor has a first width and the second bridge conductor has a second width, and the first and second widths are substantially the same.

3. The power electronics assembly of claim 2, wherein the first and second bridge conductors are arranged such that the second bridge conductor overlaps the first bridge conductor.

4. The power electronics assembly of claim 1, wherein the first support member is a first copper layer within a first copper circuit board and the second support member is a second copper layer within a second copper circuit board.

5. The power electronic assembly of claim 1, wherein the first and second support members each have first and second opposing sides, the first plurality of power switching devices and the first capacitor are on the first side of the first support member, the second plurality of power switching devices and the second capacitor are on the first side of the second support member, and the first and second support members are arranged such that the first sides of the first and second support members are positioned between the second sides of the first and second support members.

6. The power electronics assembly of claim 1, wherein the first and second capacitors each comprise a plurality of capacitor bobbins.

7. The power electronics assembly of claim 1, wherein the first plurality of power switching device and the second plurality of power switching devices are automotive power switching devices.

8. An automotive propulsion system comprising:
an electric motor;
a direct current (DC) voltage source coupled to the electric motor;
a power electronics assembly coupled to the electric motor and the DC voltage source, the power electronics assembly comprising:
a first support member comprising a first plurality of conductors;
a first plurality of power switching devices coupled to the first support member;
a first capacitor coupled to the first support member;
a second support member comprising a second plurality of conductors;
a second plurality of power switching devices coupled to the second support member;
a second capacitor coupled to the second support member,
wherein the first and second pluralities of conductors, the first and second pluralities of power switching devices, and the first and second capacitors are electrically connected such that the first plurality of power switching devices is connected in parallel with the first capacitor and the second capacitor and the second plurality of power switching devices is connected in parallel with the second capacitor and the first capacitor; and
a power bridge interconnecting the first support member and the second support member, wherein the power bridge comprises a first bridge conductor and a second bridge conductor,
wherein the first plurality of conductors and the second plurality of conductors each comprise a first conductive member and a second conductive member, and
wherein the first bridge conductor electrically interconnects the first conductive members of each of the first and second pluralities of conductors and the second bridge conductor electrically interconnects the second conductive members of each of the first and second pluralities of conductors; and
a processing system coupled to the electric motor, the DC voltage source, and the power electronics assembly.

9. The automotive propulsion system of claim 8, wherein the first and second capacitors each comprise first and second electrodes, the DC voltage source comprises first and second terminals, the first electrodes of each of the first and second capacitors is electrically connected to the first terminal of the DC voltage source, and the second electrodes of each of the first and second capacitors is electrically connected to the second terminal of the DC voltage source.

10. The automotive propulsion system of claim 9, wherein the first bridge conductor has a first width and the second bridge conductor has a second width, and the first and second widths are substantially the same, and the first and second bridge conductors are arranged such that the second bridge conductor overlaps the first bridge conductor.

* * * * *